United States Patent
Davoudian et al.

(10) Patent No.: US 9,329,854 B2
(45) Date of Patent: May 3, 2016

(54) STAGING CALCULATION FOR UPGRADE CAMPAIGN GENERATION

(71) Applicant: TELEFONAKTIEBOLAGET L M ERICSSON (PUBL), Stockholm (SE)

(72) Inventors: Ali Davoudian, Montreal (CA); Maria Toeroe, Montreal (CA); Ferhat Khendek, Montreal (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 209 days.

(21) Appl. No.: 13/788,489

(22) Filed: Mar. 7, 2013

(65) Prior Publication Data

US 2014/0259002 A1 Sep. 11, 2014

(51) Int. Cl.
*G06F 9/445* (2006.01)
*G06F 9/44* (2006.01)

(52) U.S. Cl.
CPC .. *G06F 8/65* (2013.01); *G06F 8/67* (2013.01); *G06F 8/68* (2013.01)

(58) Field of Classification Search
CPC .............. G06F 8/61; G06F 8/65; G06F 8/60; G06F 8/71; G06F 11/1433; H04L 41/0806; H04N 13/0425; H04N 9/3147; H04N 9/3185; H04N 9/3197; H04N 21/4316; H04N 21/6543; H04N 21/812; H04N 7/17336
See application file for complete search history.

(56) References Cited

U.S. PATENT DOCUMENTS

| | | | | |
|---|---|---|---|---|
| 8,291,402 B2 * | 10/2012 | Pazdziora | ............... | G06F 8/65 717/168 |
| 8,738,968 B2 * | 5/2014 | Kanso et al. | ................... | 714/40 |
| 2005/0204354 A1 * | 9/2005 | Sundararajan | ............ | G06F 8/71 717/174 |
| 2006/0168575 A1 * | 7/2006 | Bhatt | ....................... | G06F 8/65 717/168 |
| 2009/0158268 A1 * | 6/2009 | Pichetti et al. | ............... | 717/170 |
| 2009/0320019 A1 * | 12/2009 | Ellington | ................. | G06F 8/71 717/177 |
| 2010/0281473 A1 * | 11/2010 | Zhang | ..................... | G06F 8/65 717/171 |
| 2011/0035738 A1 * | 2/2011 | Toeroe et al. | ................ | 717/168 |
| 2011/0113417 A1 * | 5/2011 | McCurdy | .................. | G06F 8/65 717/170 |
| 2012/0233501 A1 * | 9/2012 | Kanso et al. | ..................... | 714/26 |
| 2012/0272225 A1 | 10/2012 | Thota et al. | | |

OTHER PUBLICATIONS

Toeroe et al. "The Emerging SAF Software Management Framework" Springer-Verlag Berlin Heidelberg 2006, pp. 253-270.*
Bergstrom, Ingvar, "SMF in OpenSAF", Jun. 2009.*
Software Managment Framework, "Service Availibitity (tm) Forum Application Interface Specification", URL: http://www.saforum.org/hoa/assn16627/images/sai-ais-smf-a.01.02.pdf, SAI-AIS-SMF-A. 01.02, (Apr. 20, 2011), 174 Pages.

(Continued)

*Primary Examiner* — Thuy Dao
*Assistant Examiner* — Cheneca Smith
(74) *Attorney, Agent, or Firm* — Nicholson, De Vos, Webster & Elliot, LLP

(57) ABSTRACT

An upgrade campaign is generated for software deployment configuration, based on a source configuration and a target configuration for a software subsystem. A delta between the source configuration and the target configuration is determined. The delta includes a first set, a second set and a third set of the entities to be removed, added and upgraded, respectively, in the software subsystem. Based on dependencies among the entities, a sequence of stages is generated for removing, adding and upgrading the first, second and third sets of the entities, such that the entities are removed, added and upgraded according to a temporal order defined by the sequence of stages.

18 Claims, 13 Drawing Sheets

(56) References Cited

OTHER PUBLICATIONS

International Search Report and Written Opinion, Application No. PCT/IB2014/059509, dated Jun. 20, 2014, 13 pages.
Davoudian, Ali, et al., "Ordering Upgrade Changes for Highly Available Component Based Systems", *2014 IEEE 15th International Symposium on High-Assurance Systems Engineering*, Jan. 9, 2014, pp. 259-260, XP032575786, IEEE, DOI:10.1109/HASE.2014.48 [retrieved on Mar. 3, 2014].
Kohzadi, Setareh, "Automatic Generation of Upgrade Campaign Specifications", Oct. 1, 2009, 102 pages, XP055122696, ISBN: 978-0-49-467318-8, *Library and Archives Canada*, retrieved from the Internet: URL: http://search.proquest.com/docview/814800797 [retrieved on Jun. 11, 2014].
International Preliminary Report on Patentability, Application No. PCT/IB2014/059509, mailed Sep. 17, 2015, 10 pages.

* cited by examiner

SOURCE CONFIGURATION 810

INTERMEDIATE CONFIGURATION (AFTER STAGE 0) 820

TARGET CONFIGURATION (AFTER STAGE 1) 830

STAGING CALCULATION FOR UPGRADE CAMPAIGN GENERATION

TECHNICAL FIELD

Embodiments of the invention relate to software management; and more specifically, to management of software reconfiguration.

BACKGROUND

The Service Availability Forum (SA Forum) is a consortium of industry-leading companies promoting a set of open specifications that enables the creation and deployment of highly available and mission critical services. As a standardization body, the SA Forum has defined a set of open specifications, including the Software Management Framework (SMF), for middleware services. The SMF is defined to support software upgrade in a SA Forum compliant system.

An SA Forum compliant system can be characterized by its deployment configuration. The deployment configuration may need to be changed at any time, for example, to tune its performance by creating new instances of an entity type, by modifying parts of the configuration, or by removing some of the existing instances. In some cases, it is necessary to downgrade entities to an earlier version of their base entity type.

The SMF orchestrates the migration of a live system from one deployment configuration to another while ensuring service availability. In SMF terms, this migration process is called an upgrade campaign. The SMF defines an XML schema to specify an upgrade campaign. The upgrade campaign is a script of actions and configuration changes that lead to the target configuration.

The SMF describes various upgrade methods; however, these methods cannot be used "as-is" for all kinds of software entities in a SA Forum compliant system without causing service outage.

SUMMARY

Embodiments of the invention provide a method and system for generating an upgrade campaign for software deployment configuration. The method comprises receiving a source configuration and a target configuration for a software subsystem. Each of the source configuration and the target configuration contains entities and associated entity types. The method further comprises determining a delta between the source configuration and the target configuration. The delta includes a first set, a second set and a third set of the entities to be removed, added and upgraded, respectively, in the software subsystem. Based on dependencies among the entities, a sequence of stages is generated for removing, adding and upgrading the first, second and third sets of the entities, such that the entities are removed, added and upgraded according to a temporal order defined by the sequence of stages. Determining the sequence of stages further comprises generating a stage and assigning one or more not-yet-assigned entities in the first, second and third sets to the stage; and repeating the generating and assigning until each of the entities in the first, second and third sets is assigned to one of the stages in the sequence.

In another embodiment, a computer system is adapted to generate an upgrade campaign for software deployment configuration. The computer system comprises one or more processors, one or more memory devices coupled to the one or more processors, and an upgrade campaign generator coupled to the one or more processors and the one or more memory devices. The upgrade campaign generator is adapted to perform the method described above.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DESCRIPTION OF EMBODIMENTS

Figure 1:
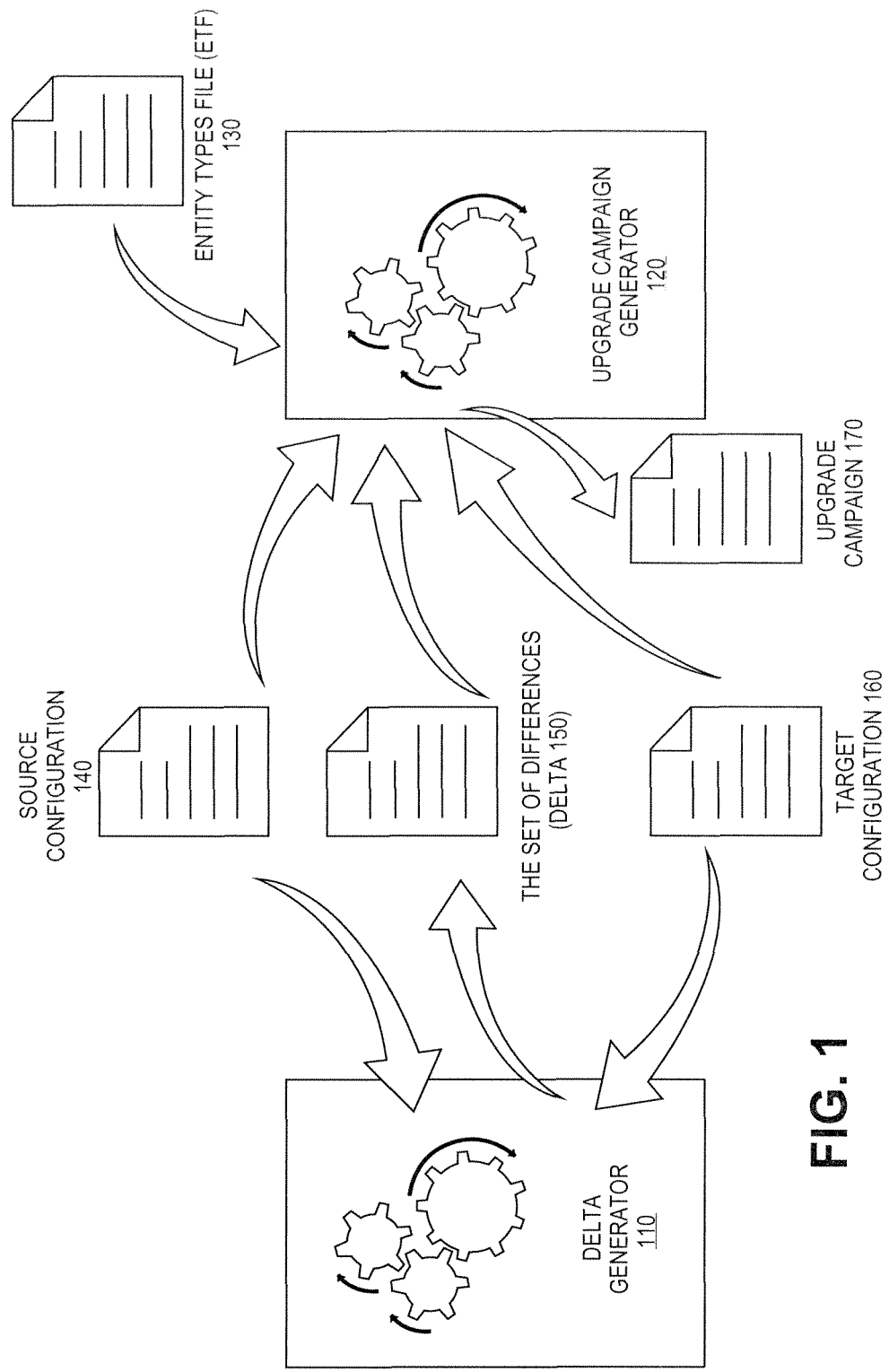
FIG. 1 is a diagram illustrating a process of upgrade campaign generation according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention formalize the calculation of stages for ordering reconfiguration actions in an upgrade campaign. The stage generation described herein uses knowledge of the dependencies among software/hardware entities ("entities") to determine the scope of impact on service availability when removing, adding or upgrading the entities during system reconfiguration. The generated stages define a temporal ordering for performing the actions of removing, adding or upgrading the entities in an upgrade campaign.

The use of stages enables a highly available system to maintain its service availability during system reconfiguration. System reconfiguration typically involves multiple reconfiguration actions to be performed on entities that are dependent on one another. Violating the dependencies among the entities during system reconfiguration can cause service outage. Without the need for maintaining service availability, a system could be shut down and then restarted with a new configuration that satisfies the new dependencies. However, in a highly available system, the dependencies among the entities need to be respected and cannot be violated such that the service availability can be maintained. Thus, the entities which need to be reconfigured are grouped into a sequence of stages, and the reconfiguration actions are performed according to the sequence of stages.

The term "upgrade campaign" specifies the actions for reconfiguring a system (e.g., a software subsystem, or a system of combined software and hardware), where the "reconfiguration" includes any combination of upgrade, downgrade and change of the configuration. Thus, the term "upgrade" throughout the description below includes any types of actions that change the configuration of an entity or a software subsystem, and is equivalent to "reconfigure" or "reconfiguration." It is appreciated that the stage calculation and generation described herein can be applied to any live upgrade of a system for SMF-compliant systems as well as non-SMF-compliant systems.

In the software subsystem described herein, the basic building block of a configuration is a component. A component is an entity that abstracts a set of software/hardware resources. Components can be deployed on nodes. The nodes provide an execution environment for the components and include virtual machines and hardware such as e.g., processors, computers, or other processing hardware. The service(s) provided by the component is represented by a component service instance (CSI). Each CSI represents a unit of workload. Components that closely collaborate and that must be collocated to provide an integrated service are grouped into a service unit (SU). Service Instance (SI) is the aggregation of the workloads of the components contained in an SU. A set of redundant SUs that collaborate to provide and protect a set of services form a service group (SG). Services are provided by SUs and protected against failures within a SG. An application is a set of SGs. These different entities identify different increasing fault zones, which are the scopes that can be isolated and repaired to isolate a fault.

FIG. 1 is a diagram illustrating a process of upgrade campaign generation according to one embodiment of the invention. The process starts with a software subsystem having a source configuration 140. The software subsystem is to be reconfigured into a target configuration 160. Each of the source configuration 140 and the target configuration 160 contains a collection of entities having associated entity types. A delta generator 110 generates a set of differences ("delta 150") between the source configuration 140 and the target configuration 160. The delta 150 describes the differences in entities and entity types between the source configuration 140 and the target configuration 160. More specifically, the delta 150 includes a first, a second and a third set of entities that are to be added, removed, and upgraded, respectively, in the software subsystem. In some embodiments, the third set of entities further contains two subsets: the first subset includes the entities and their associated entity types before a reconfiguration, and the second subset includes the same entities (as in the first subset) and their changed configuration (e.g., reconfigured entity types) after the reconfiguration.

An upgrade campaign generator 120 generates an upgrade campaign 170 based on the source configuration 140, the target configuration 160, the delta 150, and one or more Entity Types Files (ETFs) 130 provided by software vendors. The ETFs 130 describe the software resources provided by a software vendor to the software subsystem. Each ETF 130 contains a collection of entity prototypes, which specify characteristics of the entities as well as the entities' capabilities and limitations. Moreover, the entity prototypes describe how the software entities can be combined by providing information regarding their dependencies and compatibility options. From the entity prototypes a number of different entity types can be derived. Each entity type can be instantiated as one or more entities.

The upgrade campaign generator 120 identifies dependencies among entities, the potential impact of the dependencies on service availability, and how to handle each of the dependencies. The dependencies considered include but are not limited to: the dependencies between components in a same protection group, between service instances, between component service instances of a service instance, between co-located components (e.g., components co-located in the same SU or node), and between SUs of the same SG. Based on the source configuration 140 and the target configurations 160, the upgrade campaign generator 120 calculates a sequence of stages for ordering the reconfiguration actions and describes the ordering in the upgrade campaign 170. The reconfiguration actions include adding entities, removing entities and upgrading entities and entity types. Based on the dependencies between the entities, a subset of the entities in the delta 150 are identified to be added, removed and/or upgraded in each stage. During the calculation of each stage, a transient configuration of the software subsystem is updated to account for the entities assigned to that stage to be added, removed and/or upgraded. When the transient configuration of the software subsystem reaches the target configuration 160, all of the entities in the delta 150 have been assigned to a stage and the stage calculation is completed.

In one embodiment, the delta 150 of FIG. 1 is defined to include the following sets: RSet represents the set of entities to be removed from the source configuration, ASet represents the set of entities to be added into the target configuration, SrcUSet represents the set of entities in the source configuration to be upgraded (that is, the set of entities whose entities types or configurations are to be changed), and TgtUSet represents the set of entities in the target configuration that have been upgraded. SrcUSet and TgtUSet include the same set of entities; SrcUSet includes the entities before a reconfiguration (as described above as the "first subset"), and TgtUSet includes the same entities after the reconfiguration (as described above as the "second subset").

According to one embodiment, the entities which need to be added, removed or upgraded are grouped into a sequence of stages, as defined below:

$Aset_i$ is the set of entities in the target configuration which need to be added in Stage;

$Rset_i$ is the set of entities in the source configuration which need to be removed in $Stage_i$;

$SrcUset_i$ is the set of entities in the source configuration which need to be upgraded in $Stage_i$; and $TgtUset_i$ is the set of entities to which $SrcUset_i$ is upgraded in $Stage_i$.

Figure 2:
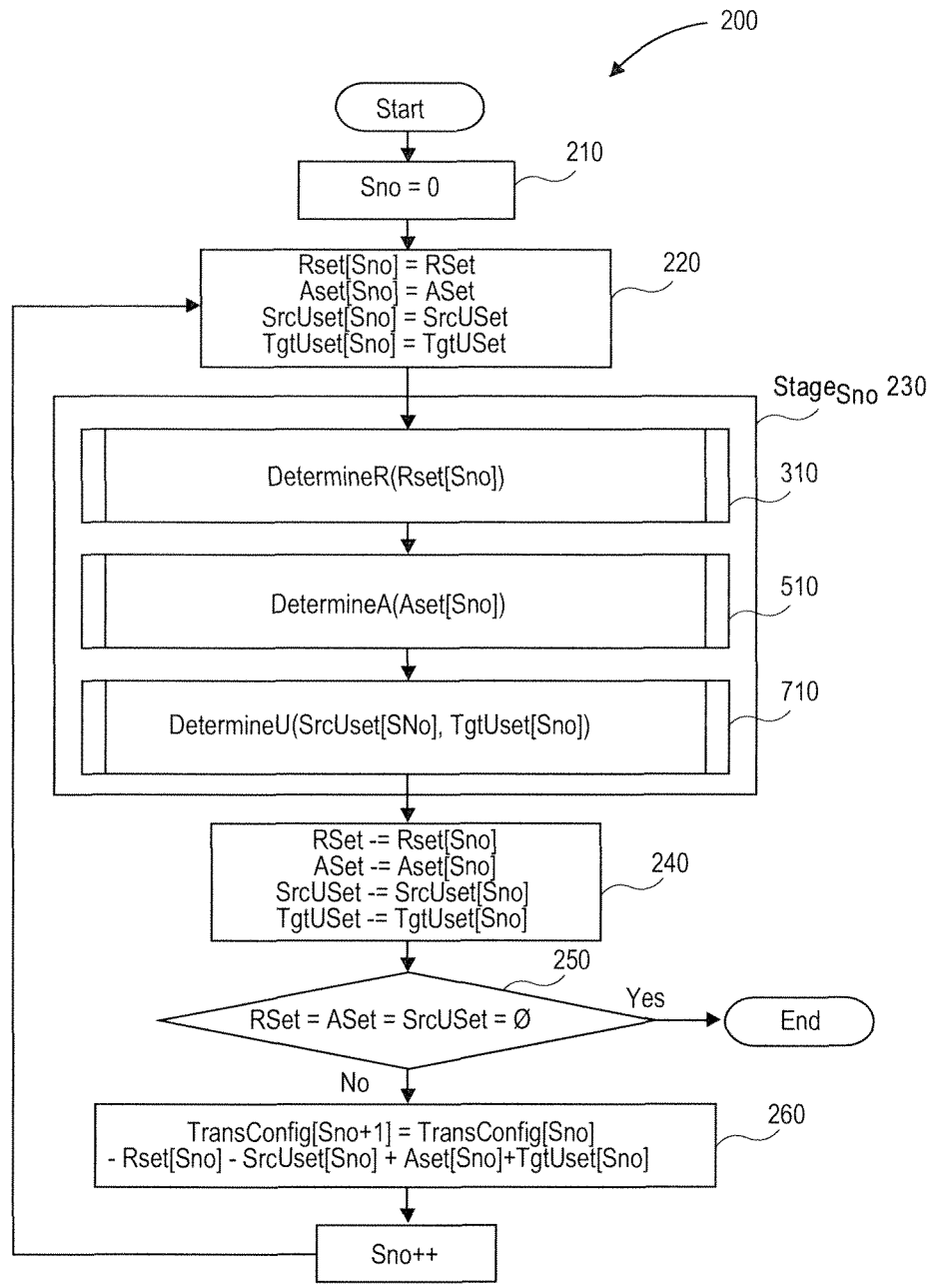
FIG. 2 is a flow diagram illustrating an overview of a method for generating the stages of an upgrade campaign, according to one embodiment of the invention.

FIG. 2 is a flow diagram illustrating an overview of a method 200 for generating the stages of an upgrade campaign, according to one embodiment. The method 200 may be performed by the upgrade campaign generator 120 of FIG. 1. In one embodiment, the method 200 may be performed by a computer system, such as a computer system 1000 of FIG. 10.

The method 200 starts with setting Sno to zero and the initial transient configuration TransConfig$_i$=SrcConfig (block 210). As used herein, the stage counter i=Sno. Initially, RSet, ASet, SrcUSet and TgtUSet are assigned to Rset$_i$, Aset$_i$, SrcUset$_i$ and TgtUset$_i$, respectively (block 220). Then within each stage, the entities and their associated entity types in each of Rset$_i$, Aset$_i$, SrcUset$_i$ and TgtUset$_i$ are determined (block 230). In one embodiment, the determination operation of block 230 is implemented by a DetermineR method (block 310), a DetermineA method (block 510) and a DetermineU method (block 710), as will be described in detail below. The determined entities and their associated entity types in each of Rset$_i$, Aset$_i$, SrcUset$_i$ and TgtUset$_i$ are removed from the sets of configuration differences represented by RSet, ASet, SrcUSet and TgtUSet (block 240). The new transient configuration TransConfig$_{i+1}$ is calculated by applying the changes in Rset$_i$, Aset$_i$, SrcUset$_i$ and TgtUset$_i$ assigned to the current stage to the current transient configuration TransConfig$_i$ (block 260). The loop (blocks 220, 230 and 240) continues until each of RSet, ASet, SrcUSet and TgtUSet is empty (block 250). When RSet, ASet, SrcUSet and TgtUSet are all empty, it means that all of the entities and their associated entity types in the delta have been assigned to a stage.

In an alternative embodiment, an entity may be marked or flagged when it is assigned to a stage for removal, addition or upgrade. That is, instead of removing the entity from RSet, ASet, SrcUSet and/or TgtUSet, an indicator associated with the entity is set to indicate its assignment to a stage. In this embodiment, the stage generation process terminates when all of the entities in RSet, ASet, SrcUSet and TgtUSet are marked or flagged.

The following description provides the details for determining each of Rset$_i$, Aset$_i$, SrcUset$_i$ and TgtUset$_i$. Initially, some definitions regarding assignment dependency (e.g., proxy-proxied relationship) and life cycle dependency (e.g., container-contained relationship) are provided:

A container/proxy/proxied SU comprises at least one container/proxy/proxied component, respectively.

A container/proxy/proxied SG comprises at least one container/proxy/proxied SU, respectively.

A contained SU comprises contained component(s).

A contained SG comprises contained SU(s).

An SU or SG may be both proxy and container. In addition they may be both proxy and proxied.

Figure 3A:
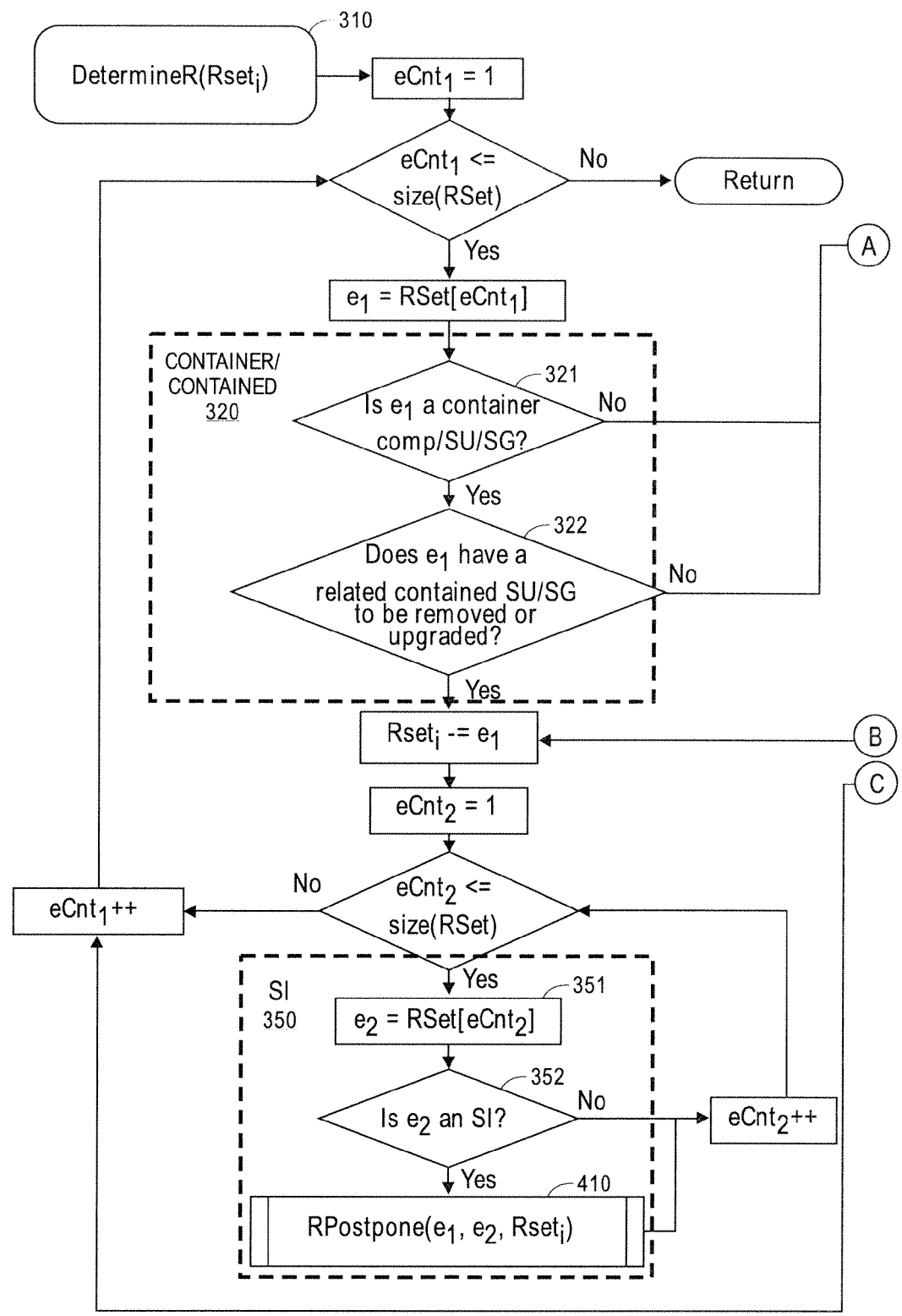
FIG. 3A and FIG. 3B illustrate a flow diagram of a method for determining the entities to be removed in a stage, according to one embodiment of the invention.
Figure 3B:
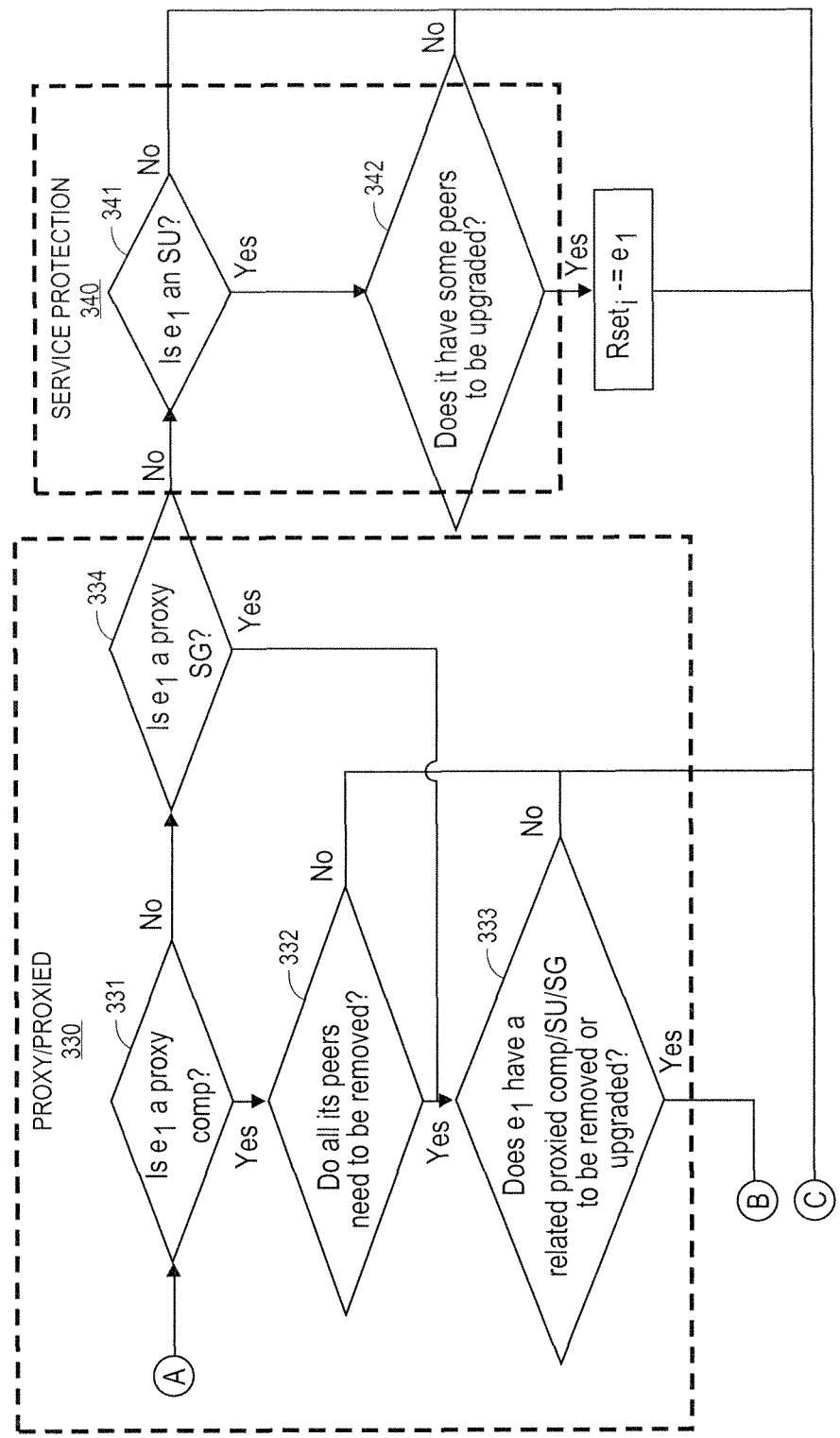

FIG. 3A and FIG. 3B illustrate a flow diagram of the method DetermineR 310 for determining the entities in Rset$_i$, according to one embodiment of the invention. As aforementioned Rset$_i$ describes a set of entities and their associated entity types in RSet which need to be removed in Stage$_i$. The method 310 may be performed by the upgrade campaign generator 120 of FIG. 1. In one embodiment, the method 310 may be performed by a computer system, such as the computer system 1000 of FIG. 10.

The method 310 uses at least four kinds of dependencies:

(1) Container/contained dependency: According to this dependency, a contained component needs to be removed or upgraded to non-contained component before removing its related container.

(2) Proxy/proxied dependency: According to this dependency, a proxied component needs to be removed or upgraded to non-proxied component before the removal of all its related proxies.

(3) SI dependency: According to this dependency, when the removal of a service provider is postponed to the next stage, the removal of its assignable (or protected) services also needs to be postponed. In addition, the removal of all sponsoring services of that service needs to be postponed. A sponsoring service must be assigned before the dependent one can be assigned. This dependency needs to be recursively applied to a chain of sponsoring services.

(4) Service protection dependency: Assume that by upgrading an SU in an SG, its capacity for getting new services will be increased. Therefore, the upgrade is accompanied with the removal of some of the SUs from the same SG that are no longer needed. Within the same stage the order of reconfiguration actions is removal, upgrade and addition, which means that if the upgrade and removal performed in the same stage, the service capacity will decrease from the moment of the removal till the upgrade is completed. To avoid capacity degradation, the SU upgrade needs to be performed before (i.e., in an earlier stage than) the SU removal. The same occurs when addition of SUs is accompanied by an upgrade (or downgrade) that decreases the service capacity. Therefore, when adding, removing and upgrading of SUs belonging to an SG, the reconfiguration actions are ordered across different stages to guarantee the order of addition, followed by upgrade, and then followed by removal so that there will be no impact on services protected by that SG.

The method 310 determines whether each not-yet-assigned entity in RSet can be assigned to be a member of Rset$_i$; that is, whether the entity can be removed in Stage$_i$. In the embodiment of FIG. 2 (block 220), at the beginning of stage generation for each stage Rset$_i$ is set to be RSet. That is, all entities in RSet are considered for removal in Stage$_i$ while the RSet is used to track those entities that have not been assigned to a stage. When an entity ($e_1$) is found to be in a dependency so that it cannot be removed in Stage$_i$, $e_1$ is removed from Rset$_i$.

In one embodiment, the method 310 begins with testing $e_1$ for the container/contained dependency (block 320). It is tested whether $e_1$ is a container entity (where the entity may be a component, SU or SG) (block 321), whether $e_1$ has a related contained SU or SG to be removed or upgraded (block 322). If the removal of $e_1$ is constrained by the container/contained dependency (that is, when the answers to the tests in blocks 321 and 322 are both yes), then $e_1$ cannot be in Rset$_i$; that is, $e_1$ cannot be removed in Stage$_i$. Then the method 310 continues to test other entities in RSet with respect to their SI dependency with $e_1$ (block 350).

If $e_1$ passes the container/contained dependency test (that is, when the answer to either test in block 321 or 322 is no), $e_1$ is continued being tested for the proxy/proxied dependency (block 330 in FIG. 3B). In this test, $e_1$ is tested for whether it is a proxy component (block 331), whether all its peers—i.e., components assignable to the same proxy role—need to be removed (block 332), and whether $e_1$ has a related proxied component/SU/SG to be removed or upgraded (block 333). If $e_1$ is not a proxy component, it is also tested whether $e_1$ is a proxy SU (block 334). Based on the results of these tests, the method 310 determines whether $e_1$ is a member of Rset$_i$, whether $e_1$ is to be tested for the SI dependency (block 350), or whether $e_1$ is to be tested for the service protection dependency (block 340 of FIG. 3B).

In the test for the service protection dependency (block 340), the method 310 determines whether $e_1$ is a SU (block 341) and whether $e_1$ has some peers to be upgraded (block 342). If the answers to both tests in blocks 341 and 342 are yes, then $e_1$ cannot be a member of Rset$_i$. Otherwise, $e_1$ can stay in Rset$_i$, which means it can be removed in Stage$_i$.

In the test for the SI dependency (block 350 of FIG. 3A), the method 310 determines whether the removal of another SI entity ($e_2$) in RSet (blocks 351 and 352) is to be postponed due to its SI dependency with $e_1$ (where it has determined that the removal of $e_1$ is to be postponed to a later stage). The determination of the SI dependency with respect to entity removal is performed by a method RPostpone 410 of FIG. 4.

Figure 4:
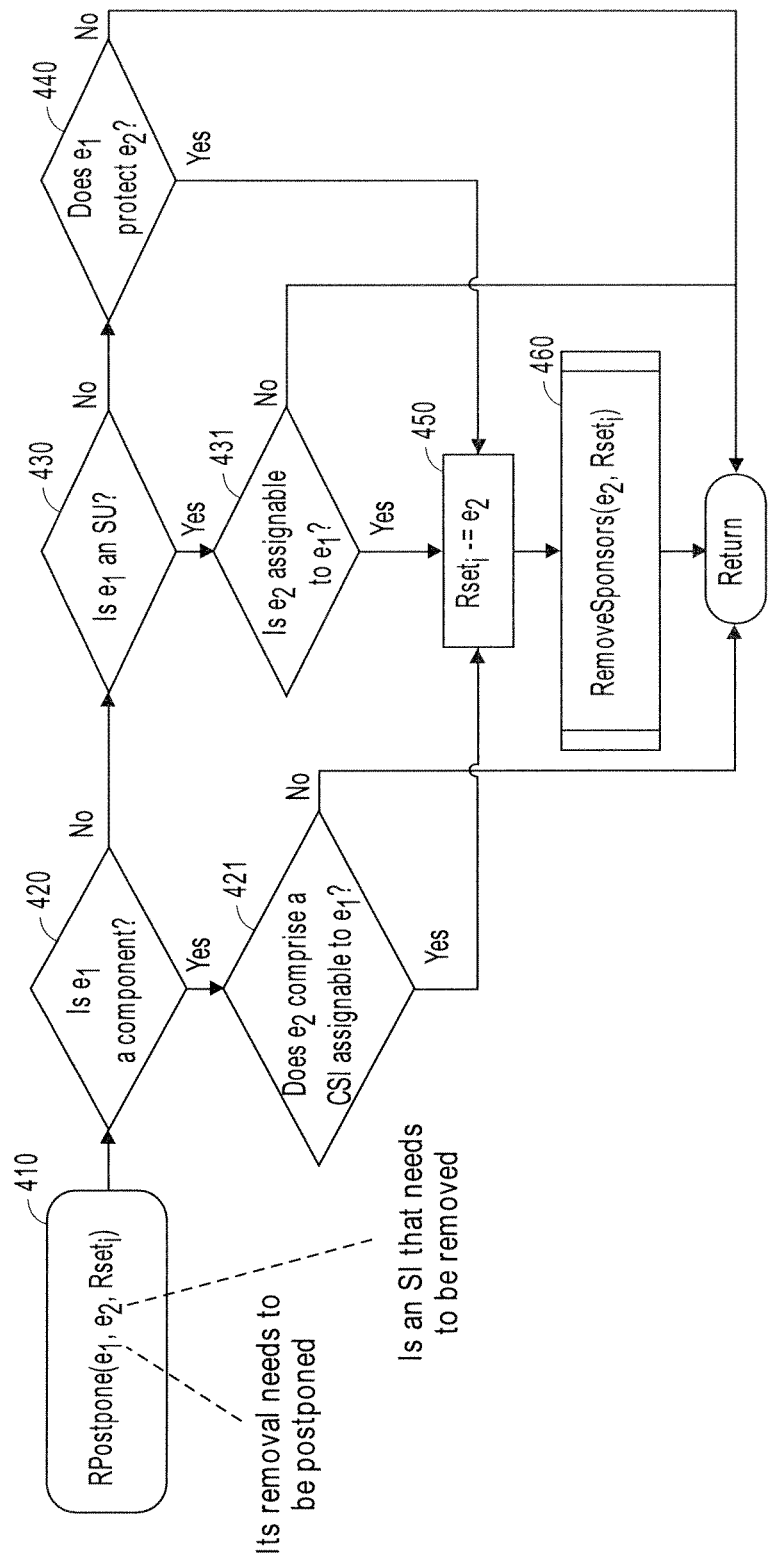
FIG. 4 illustrates a flow diagram of a method for determining service instance dependency with respect to entity removal according to one embodiment of the invention.

FIG. 4 is a flow diagram illustrating the method RPostpone 410 according to one embodiment of the invention. The method RPostpone 410 determines whether postponing the removal of $e_1$ causes the removal of $e_2$ to be postponed as well, where $e_2$ is a not-yet-assigned service (SI or CSI) entity in RSet. The method 410 determines whether $e_1$ is a component (block 420), whether $e_1$ is a SU (block 430), and whether $e_1$ protects $e_2$ (block 440). If $e_1$ is a component, then it is tested whether $e_2$ comprises an assignable CSI to $e_1$ (block 421). If $e_1$ is a SU, then it is tested whether $e_2$ is an SI assignable to $e_1$ (block 431). If the answer to any of the tests in blocks 421, 431 and 440 is yes, then the removal of $e_2$ needs to be postponed to a later stage (block 450). The effect of postponing the removal of $e_2$ propagates through its dependency chain. A method RemoveSponsors 460 is performed to carry out the postponement of removing the dependency chain. For every service instance $SI_2$ in RSet that has not been assigned to a stage, the method RemoveSponsors 460 determines whether $SI_2$ is in the dependency chain of $e_2$; if it is, the removal of $SI_2$ is also postponed. The method RemoveSponsors 460 can be described as follows:

```
Void RemoveSponsors (service instance e2, set *S)
  for (each service instance SI2 in RSet){
    if (e2 depends on SI2){
      *S -= SI2;
      RemoveSponsors (SI2, &S);}}
```

Therefore, postponing the removal of a service provider means that the removal of its service(s) also needs to be postponed. Postponing the removal of a service means postponing the removal of its chain of sponsoring services and their service providers.

Figure 5A:
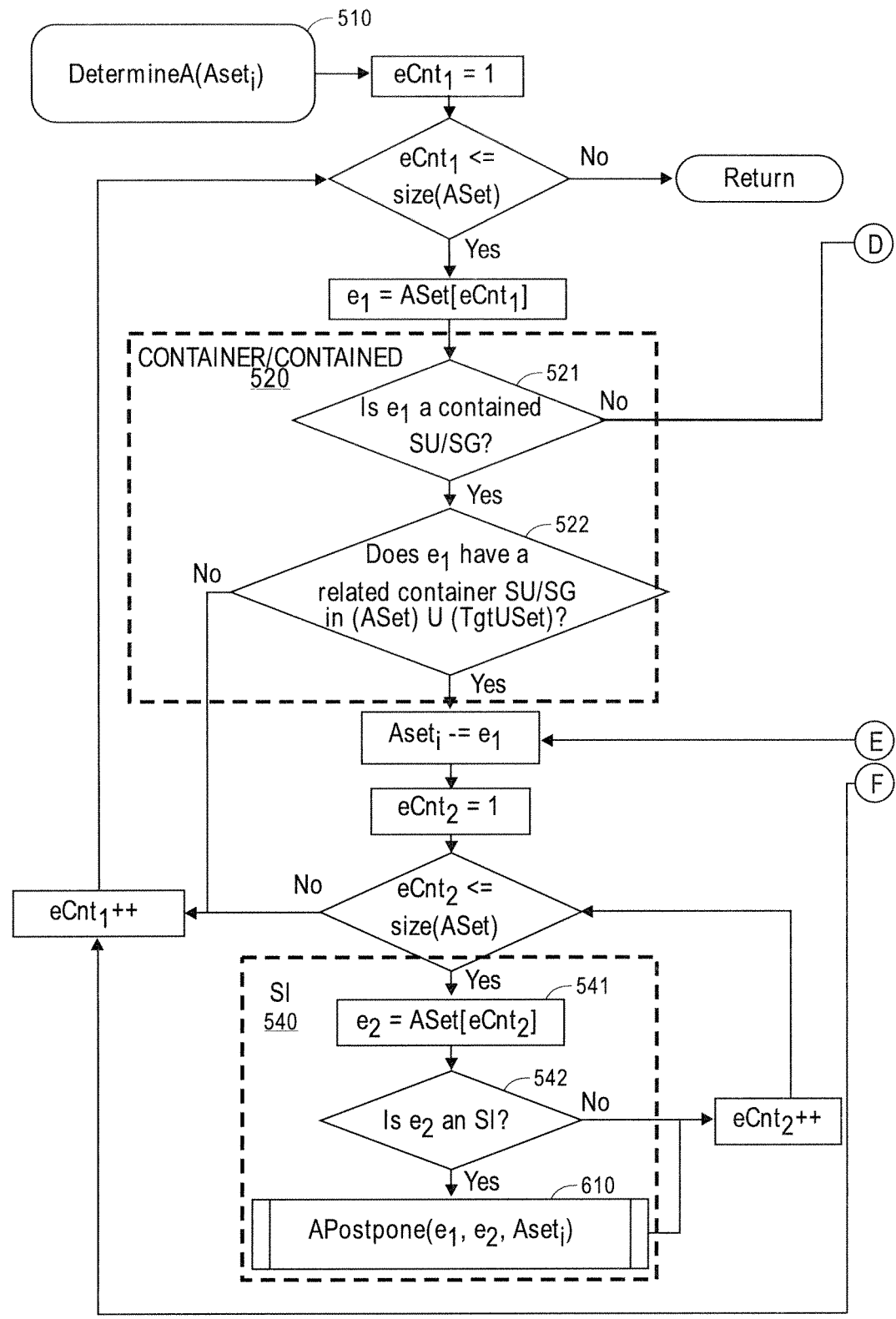
FIG. 5A and FIG. 5B illustrate a flow diagram of a method for determining the entities to be added in a stage, according to one embodiment of the invention.
Figure 5B:
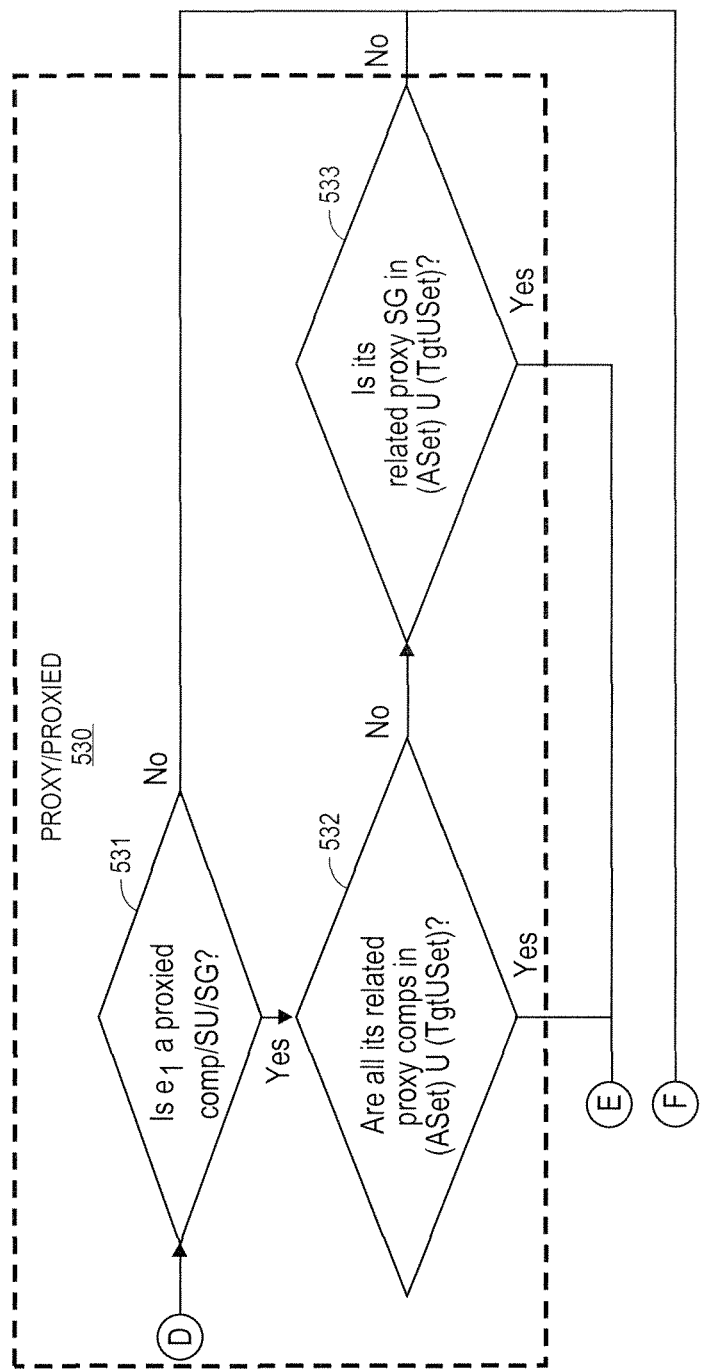

FIGS. 5A and 5B illustrate a flow diagram of the method DetermineA 510 for determining the entities in $Aset_i$. As aforementioned $Aset_i$ describes a set of entities and their associated entity types in ASet which need to be added in $Stage_i$. The method 510 may be performed by the upgrade campaign generator 120 of FIG. 1. In one embodiment, the method 510 may be performed by a computer system, such as the computer system 1000 of FIG. 10.

The method 510 uses at least three kinds of dependencies:

(1) Container/contained dependency: According to this dependency, a contained component needs to be added after adding its related container, or after upgrading a non-container component as its related container component. For example, if a container is added/removed at the same time when a contained component is added/removed, the whole SU of that component should be added/removed as the entire SU is in the same container.

(2) Proxy/proxied dependency: According to this dependency, a proxied component needs to be added after adding all its related proxies, or after upgrading some non-proxy components as its related proxy components.

(3) SI dependency: According to this dependency, when the addition of a service provider is postponed to the next stage, the addition of its assignable or protected services also needs to be postponed. Also, the addition of all dependent services to that service needs to be postponed. This dependency needs to be recursively applied to the chain of dependent services.

The service providers of the dependent services are also postponed if rollback is considered when the upgrade fails. During the rollback, the entities added by the failed upgrade are removed to avoid service impact as the staging for addition needs to be symmetric with respect to the staging necessary for removal.

The method 510 determines whether each not-yet-assigned entity in ASet can be assigned to be a member of $Aset_i$; that is, whether the entity can be added in $Stage_i$. In the embodiment of FIG. 2 (block 220), at the beginning of stage generation for each stage $Aset_i$ is set to be ASet. That is, all entities in ASet are considered for addition in $Stage_i$, while the ASet is used to track those entities that have not been assigned to a stage. When an entity ($e_1$) is found to be in a dependency so that it cannot be added in $Stage_i$, $e_i$ is removed from $Aset_i$.

In one embodiment, the method 510 begins with testing $e_1$ for the container/contained dependency (block 520). It is tested whether $e_1$ is a contained SU or SG (block 521), and whether $e_1$ has a related container component, SU or SG that is to be added or upgraded (that is, whether the related component/SU/SG is in the union of ASet and TgtUSet) (block 522). If the answer to the former test is yes and to the latter test is no, then $e_1$ is a member of $Aset_i$; that is, $e_1$ can be added in $Stage_i$. The method 510 continues to test other entities in ASet with respect to their SI dependency with $e_1$ (block 540).

If $e_1$ is not a contained SU or SG (block 521), $e_1$ is continued being tested for the proxy/proxied dependency (block 530 of FIG. 5B). In this test, $e_1$ is tested for whether it is a proxied component, SU or SG (block 531), and whether all its related proxy components are to be added or upgraded (block 532). If the answers to both tests are yes, then the addition of $e_1$ is postponed, and $e_1$ is further subject to the SI dependent test (block 540 of FIG. 5A). If $e_1$ is a proxied component, SU, or SG, but not all its related proxy components are to be added or upgraded, then $e_1$ is tested for whether its related SG is to be added or upgraded (block 533). If the answer to the test in block 533 is no, then $e_1$ can be added in $Stage_i$. Otherwise, the addition of $e_1$ is postponed to a later stage, and $e_1$ is tested for the SI dependency (block 540).

In the test for the SI dependency (block 540), the method 510 determines whether the addition of another SI entity ($e_2$) in Aset (blocks 541 and 542) is to be postponed due to its SI dependency with $e_1$ (where it has determined that the addition of $e_1$ is to be postponed to a later stage). The determination of the SI dependency with respect to entity addition is performed by a method APostpone 610 of FIG. 6.

Figure 6:
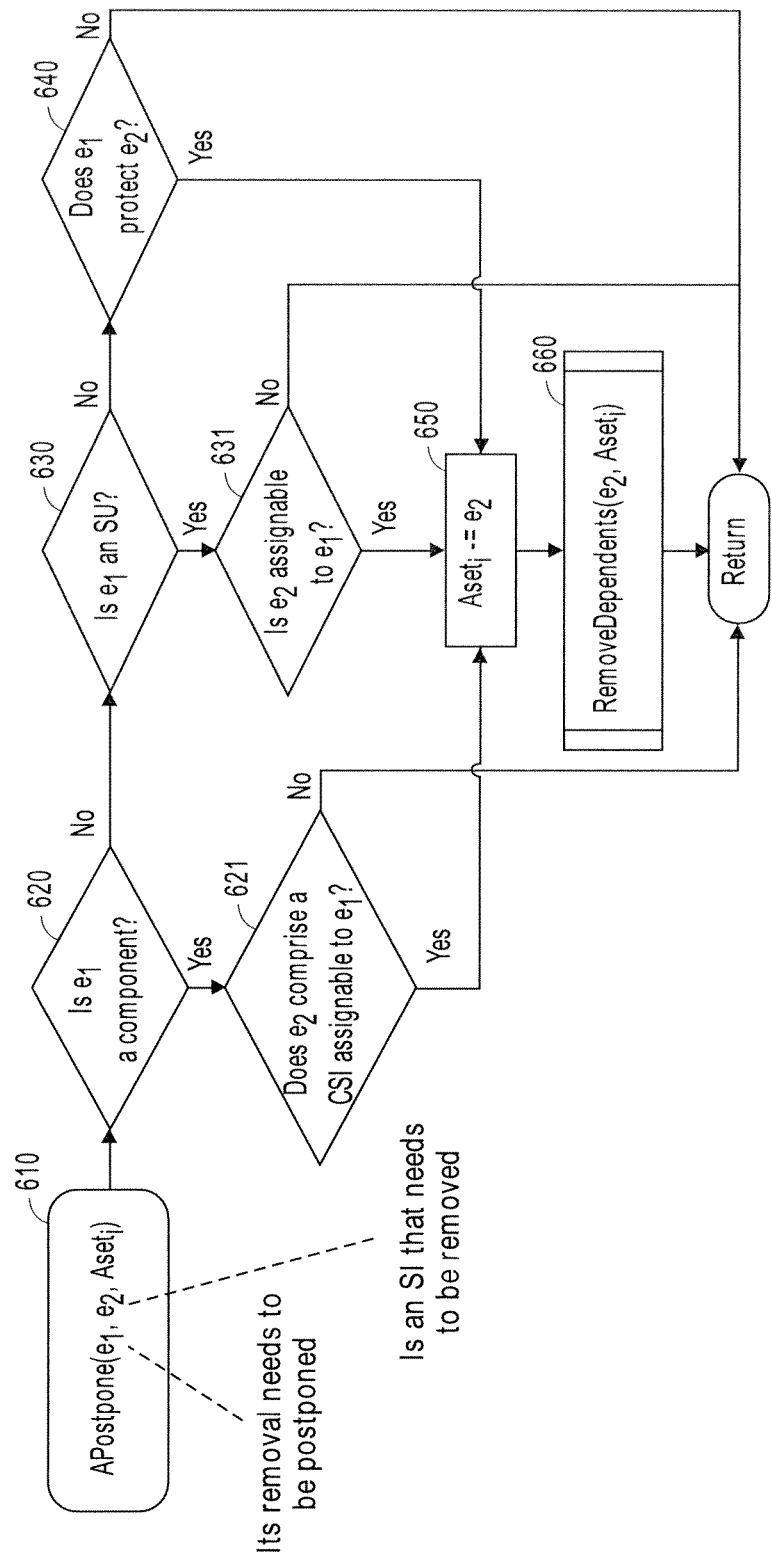
FIG. 6 is a flow diagram of a method for determining service instance dependency with respect to entity addition according to one embodiment of the invention.

FIG. 6 is a flow diagram illustrating the method APostpone 610 for determining whether postponing the addition of $e_1$ causes the addition of $e_2$ to be postponed as well, where $e_2$ is a not-yet-assigned SI entity in Aset. The method 610 determines whether $e_1$ is a component (block 620), whether $e_1$ is a SU (block 630), and whether $e_1$ protects $e_2$ (block 640). If $e_1$ is a component, then it is tested whether $e_2$ comprises an assignable CSI to $e_1$ (block 621). If $e_1$ is a SU, then it is tested whether $e_2$ is assignable to $e_1$ (block 631). If the answer to any of the tests in blocks 621, 631 and 640 is yes, then the addition of $e_2$ needs to be postponed to a later stage (block 650). The effect of postponing the addition of $e_2$ propagates through its dependency chain. A method RemoveDependents 660 is performed to carry out the postponement of adding the dependency chain. For every service instance $SI_2$ in ASet that has not been assigned to a stage, the method RemoveDependents 660 determines whether $SI_2$ is in the dependency chain of $e_2$;

if it is, the addition of $SI_2$ is also postponed. The method RemoveDependents 660 can be described as follows:

```
Void RemoveDependents (service instance e₂, set *S)
    for (each service instance SI₂ in ASet){
        if (e₂ depends on SI₂){
            *S -= SI₂;
            RemoveDependents (SI₂, &S);}}
```

Therefore, postponing the addition of a service provider means that the addition of its service(s) needs to be postponed as well. Postponing the addition of a service means postponing the addition of its chain of dependent services. In some embodiments, postponing the addition of a service further means postponing the addition of its chain of dependent services, and optionally their service providers as described above with respect to the rollback of entity addition in the event of a failed upgrade.

Figure 7A:
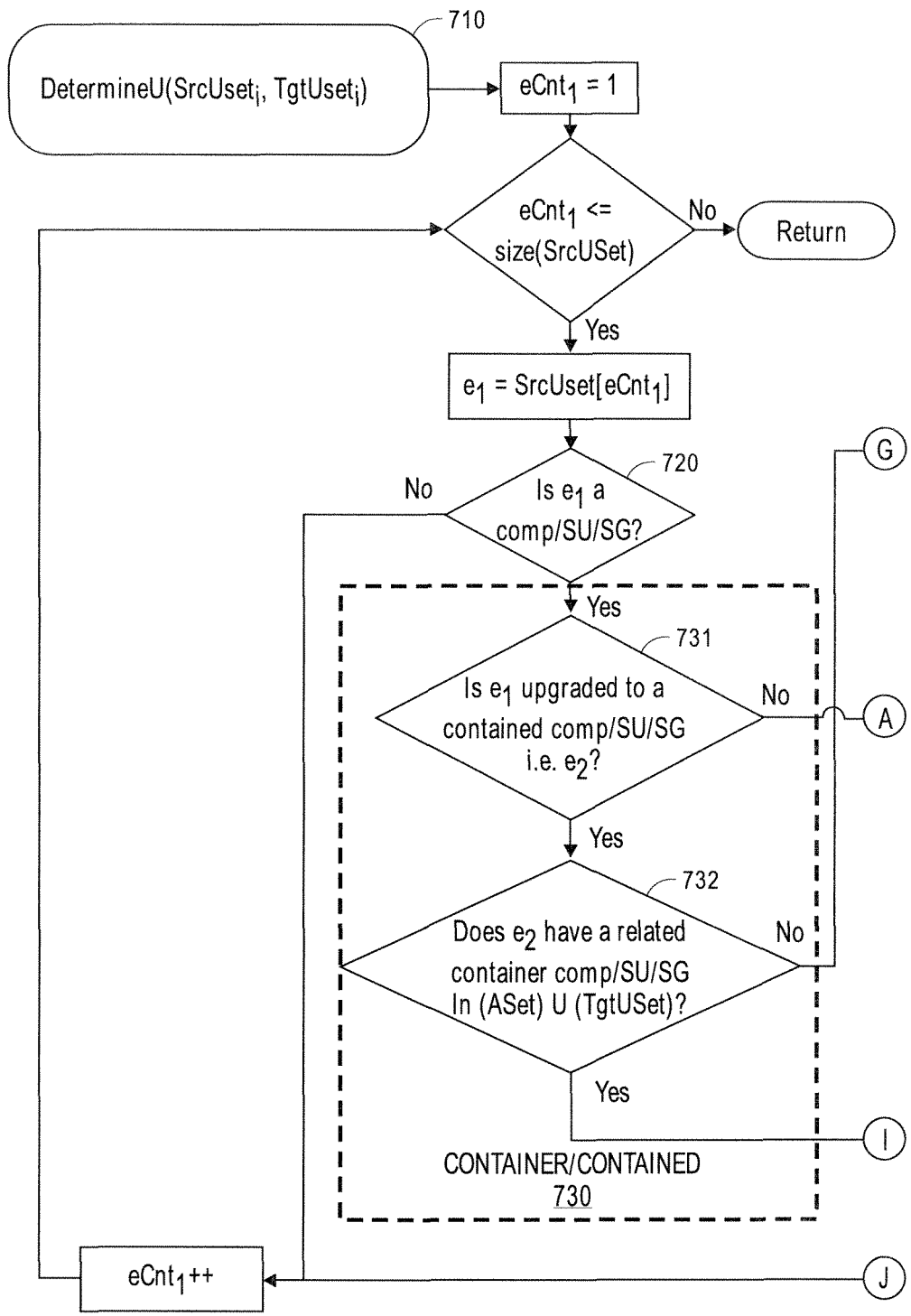
FIG. 7A and FIG. 7B illustrate a flow diagram of a method for determining the entities to be upgraded in a stage, according to one embodiment of the invention.
Figure 7B:
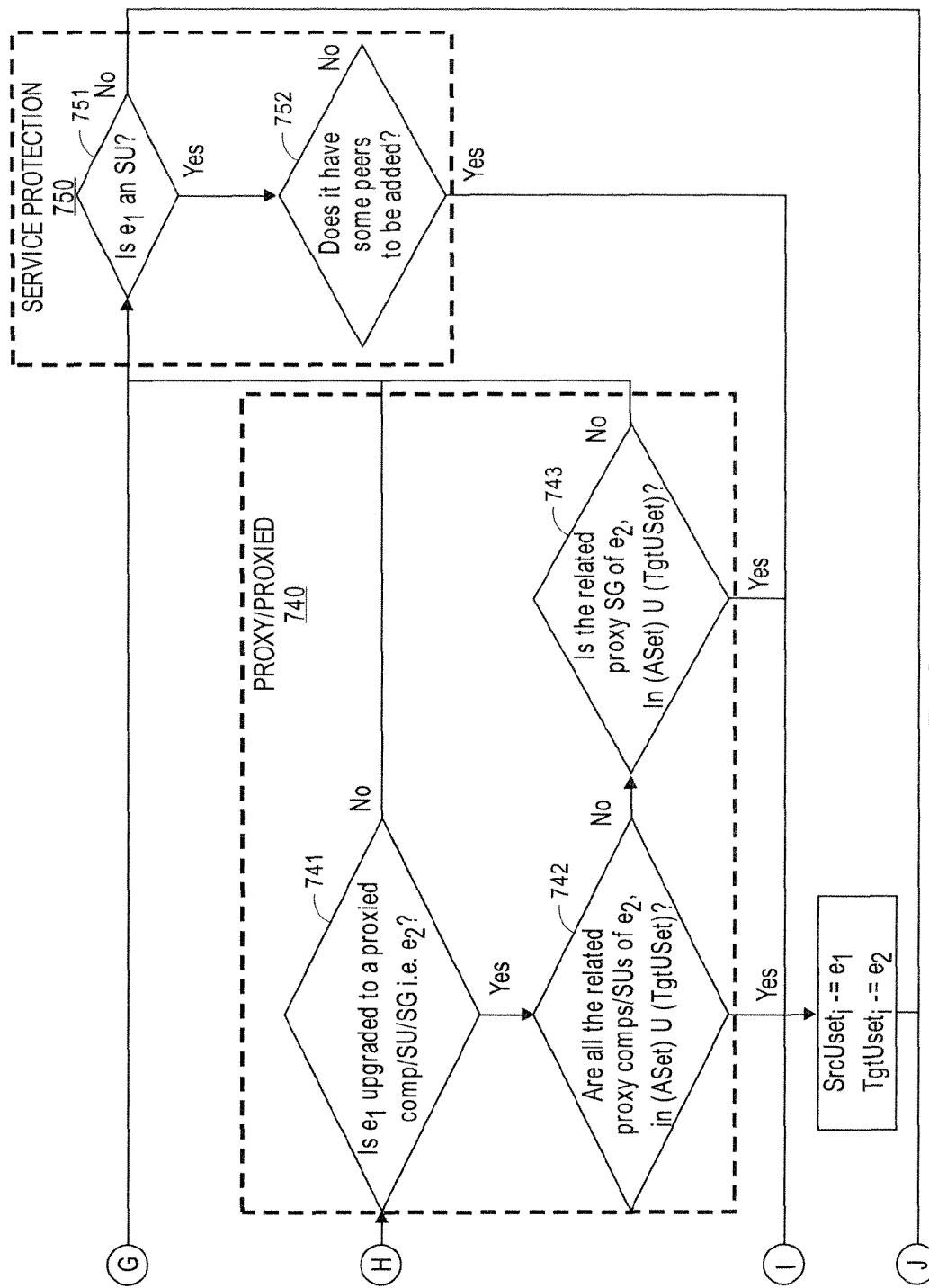

FIGS. 7A and 7B illustrate a flow diagram of the method DetermineU 710 for determining the entities in $SrcUset_i$ and $TgtUset_i$. As aforementioned $SrcUset_i$ is a subset of entities and their associated entity types in SrcSet that need to be upgraded in $Stage_i$, and $TgtUset_i$ is a subset of entities and their associated entity types in TgtUSet that have been upgraded in this $Stage_i$. $SrcUset_i$ and $TgtUset_i$ contain the same subset of entities, but the entity types in these two subsets may be different. The method 710 may be performed by the upgrade campaign generator 120 of FIG. 1. In one embodiment, the method 710 may be performed by a computer system, such as the computer system 1000 of FIG. 10.

The method 710 uses at least three kinds of dependencies:

(1) Container/contained dependency: According to this dependency, the upgrade of a non-contained component to a contained component needs to be performed after adding its related container, or after upgrading a non-container component to its related container component.

(2) Proxy/proxied dependency: According to this dependency, the upgrade of a non-proxied component to a proxied component needs to be performed after adding all its related proxies, or after upgrading some non-proxy components and its related proxy components.

(3) Service protection dependency: As aforementioned, when adding or upgrading of SUs belonging to a SG, addition should be performed before upgrade. Otherwise, there will be an impact on services protected by that SG.

The method 710 determines whether each not-yet-assigned entity in SrcUSet can be assigned to be a member of $SrcUset_i$, and each not-yet-assigned entity in TgtUSet can be assigned to be a member of $TgtUset_i$; that is, whether the entity can be upgraded in $Stage_i$. In the embodiment of FIG. 2 (block 220), at the beginning of stage generation for each stage $SrcUset_i$ is set to be SrcUSet and $TgtUset_i$ is set to be TgtUSet. That is, all entities in SrcUSet and TgtUSet are considered for upgrade in $Stage_i$, while the SrcUSet and TgtUSet are used to track those entities that have not been assigned to a stage yet. When an entity ($e_1$) is found to be in a dependency so that it cannot be upgraded in $Stage_i$, $e_1$ is removed from $SrcUset_i$. The same applies to $TgtUset_i$.

In one embodiment, the method 710 begins with testing whether $e_1$ is a component, SU or SG (block 720). If $e_1$ is not, then $e_1$ can be upgraded in $Stage_i$. If $e_1$ is a component, SU or SG (block 720), then $e_1$ is further tested for the container/contained dependency (block 730). In this test, it is determined whether $e_1$ is upgraded to a contained component, SU or SG (i.e., $e_2$) (block 731), and whether $e_2$ has a related container component, SU or SG in ASet or TgtUSet (block 732), where "U" in block 732 indicates the union of two sets. Depending on the answers to these tests, $e_1$ is further tested for proxy/proxied dependency (block 740) and service protection dependency (block 750). In the proxy/proxied dependency of block 740, it is tested whether $e_1$ is upgraded to a proxied component, SU or SG (i.e., $e_2$) (block 741), whether all of the related proxy components and SUs of $e_2$ are in ASet or TgtUSet (block 742), and whether the related proxy SG of $e_2$ is in ASet or TgtUSet (block 743).

In the service protection dependency of block 750, it is tested whether $e_1$ is a SU (block 751) and, if it is, whether $e_1$ has some peers—i.e., SUs assignable the same SIs—to be added (block 752). Depending on the answers to the tests as shown in FIGS. 7A and 7B, $e_1$ can be a member of $SrcUset_i$ and $TgtUset_i$, or the upgrade of $e_1$ will be postponed to a later stage.

Figure 8:
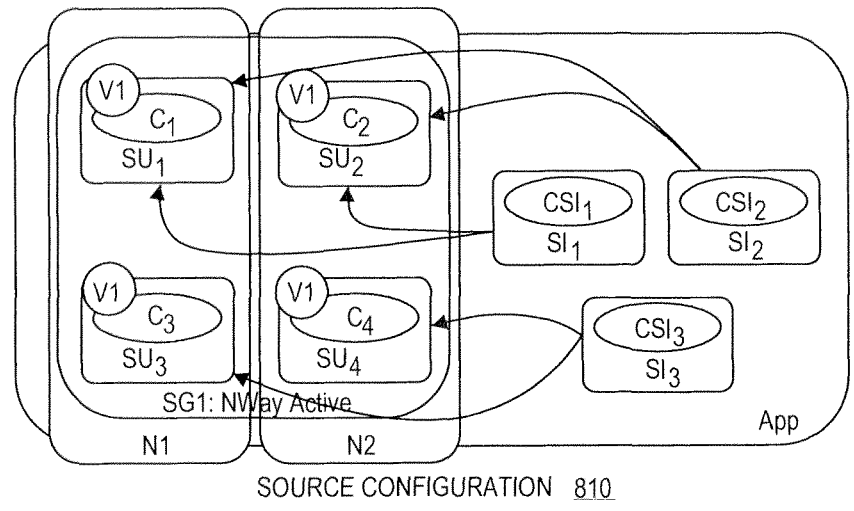
FIG. 8 illustrates an example of stage generation during an upgrade campaign generation, according to one embodiment of the invention.
Figure 8:
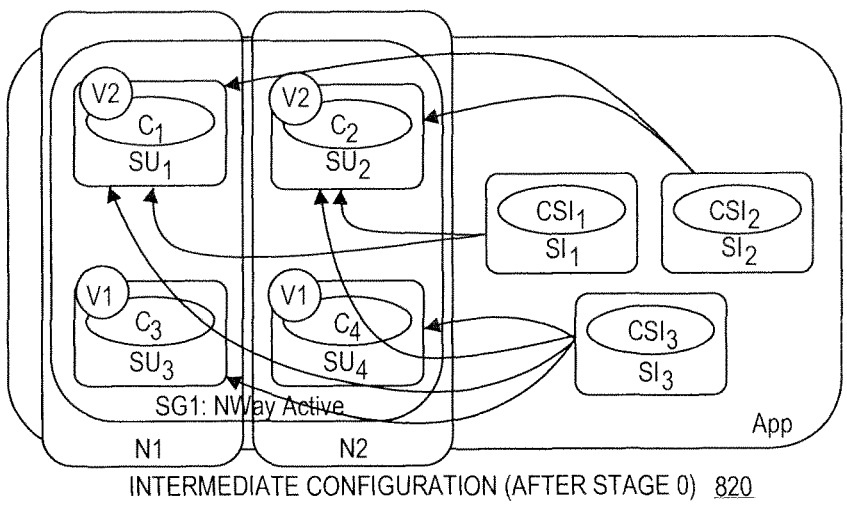
Figure 8:
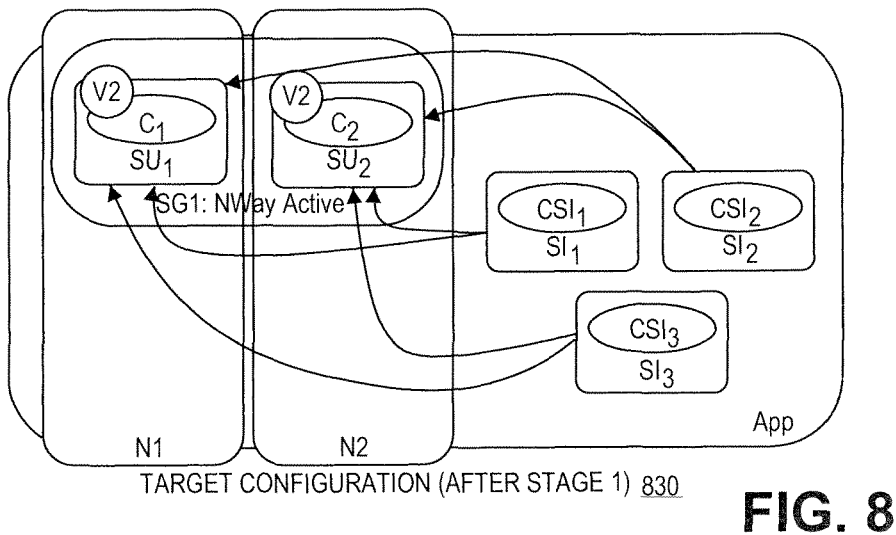

FIG. 8 is a diagram illustrating an example of stage generation for an upgrade campaign according to one embodiment of the invention. The stage generation uses the methods described above with respect to removal, addition and upgrade of entities and their entity types in a software subsystem. Initially, the software subsystem has a source configuration 810 that includes SU1, SU2, SU3 and SU4. Each of the SUs includes one component C1, C2, C3 or C4. These SUs have their respective assignable service instances SI1, SI2 and SI3 as shown in 810 of FIG. 8. Each of the SIs has a component service instance CSI1, CSI2, or CSI3.

In this example, SU1 and SU2 are upgraded (e.g., from v1 to v2) to provide more capacity for the SIs; as a result, SU3 and SU4 can be removed to form a target configuration 830. The delta between the source configuration 810 and the target configuration 830 can be grouped into three sets RSet, ASet and USet, where USet further includes SrcUSet and TgtUSet, which have the same entities but different entity types (indicated by v1 and v2). Initially, RSet={SU3, SU4}, ASet={ }, SrcUSet={SU1/v1, SU2/v1, C1/v1, C2/v1}, and TgtUSet={SU1/v2, SU2/v2, C1/v2, C2/v2}.

At Stage 0, the entities that can be removed, added or upgraded in this stage are: $Rset_0$={ }, $Aset_0$={ }, $SrcUset_0$={SU1/v1, SU2/v1, C1/v1, C2/v1}, and $TgtUset_0$={SU1/v2, SU2/v2, C1/v2, C2/v2}. That is, testing SU3 and SU4 in the RSet for service protection (as shown and described in block 340 of FIG. 3B) indicates that their removal needs to be postponed, therefore, $Rset_0$={ }. After the reconfiguration in Stage 0, the software subsystem has an intermediate (i.e., transient) configuration 820 where SU1 and SU2 have been upgraded from v1 to v2; therefore, SI3 can be assigned to SU1 and SU2 as well as to SU3 and SU4.

At Stage 1, the entities that can be removed, added or upgraded in this stage are: $Rset_1$={SU3, SU4}, $Aset_1$={ }, $SrcUset_1$={ }, $TgtUset_1$={ }. After the reconfiguration in Stage 1, the software subsystem has reached the target configuration 830 where SU3 and SU4 (as well as their associated components) have been removed.

The example of FIG. 8 illustrates how the dependencies among the entities influence the order of the reconfiguration actions. Due to the dependencies, entities (e.g., SU1 and SU2) are first upgraded (e.g., to a higher capacity) before removal of entities (e.g., SU3 and SU4) that are no longer needed after the upgrade. In one scenario, the upgraded SU1 and SU2 have sufficient capacity to support all of SI1, SI2 and SI3, so SU3 and SU4 are no longer needed after the upgrade. Thus, the SI (e.g., SI3) assigned to the no-longer-needed SUs can be switched to the high-capacity SUs after the high-capacity SUs are ready to provide services. As a result, the services provided by the system can be maintained during the system reconfiguration.

Figure 9:
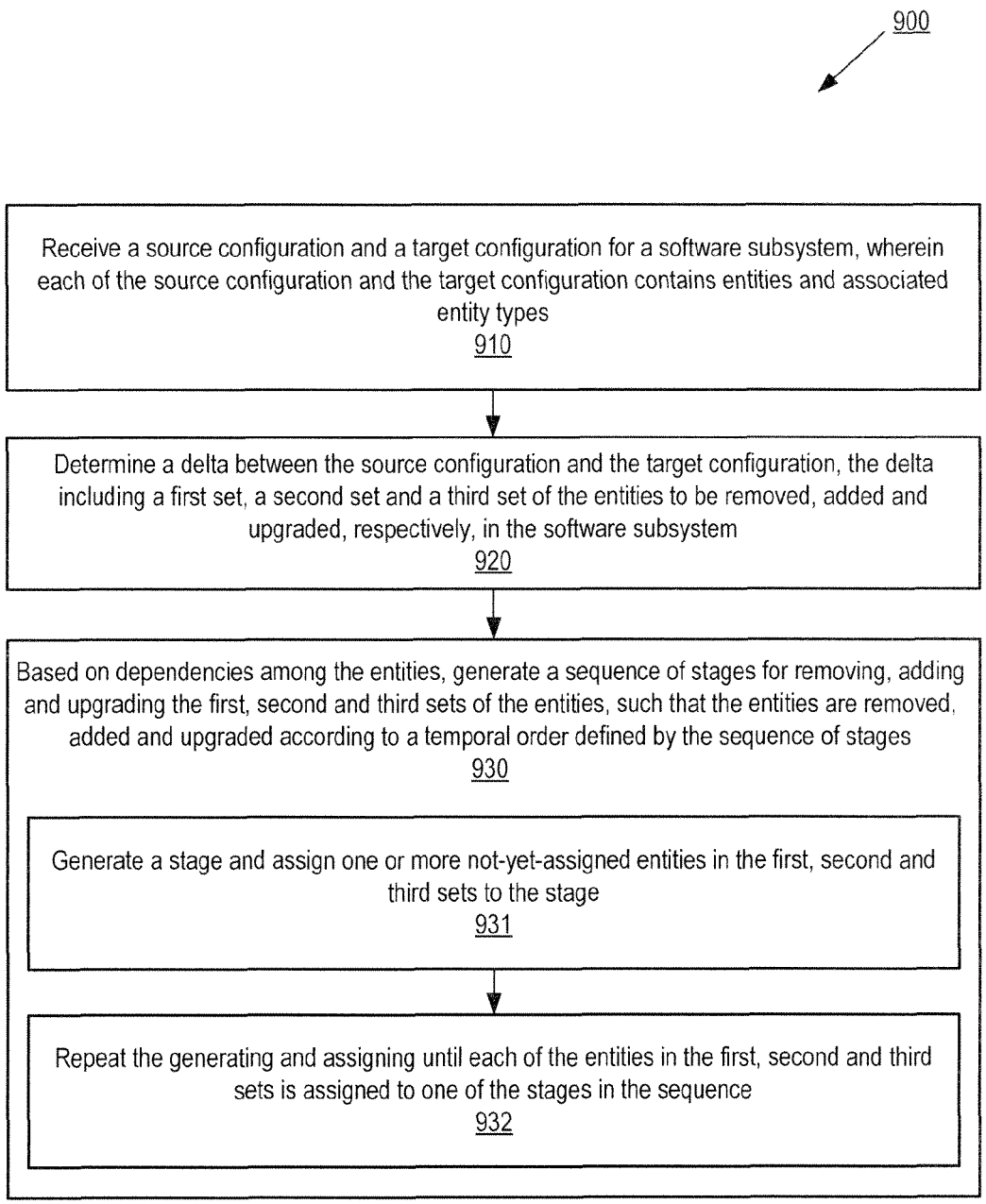
FIG. 9 illustrates a flow diagram of a method for stage calculation in an upgrade campaign generation, according to one embodiment of the invention.

FIG. 9 illustrates a method 900 for generating an upgrade campaign for software deployment configuration, according to one embodiment of the invention. The method 900 may be performed by a computer system, such as a computer system 1000 that executes an upgrade campaign generator module to be described below with reference to FIG. 10. One or more parts of an embodiment of the invention may be implemented using different combinations of software, firmware, and/or hardware.

In one embodiment, the method 900 begins with the computer system 1000 receiving a source configuration and a target configuration for a software subsystem (block 910). Each of the source configuration and the target configuration contains entities and associated entity types. The software subsystem may be located in the computer system 1000, or in another computer system that can access the resulting upgrade campaign from the computer system 1000.

The computer system 1000 determines a delta between the source configuration and the target configuration, the delta including a first set, a second set and a third set of the entities to be removed, added and upgraded, respectively, in the software subsystem (block 920). In one embodiment, the first set contains the entities and their associated entity types to be removed from the source configuration, the second set contains the entities and their associated entity types to be added to the target configuration, and the third set contains the entities having changed entity types or changed configurations between the source configuration and the target configuration. As described above with reference to FIGS. 2, 7A and 7B, in some embodiments the third set may be further defined to include a SrcUSet and a TgtUSet, both of which include the same entities, but some of the entities in SrcUSet may have different entity types from their counterparts in TgtUSet.

Based on the dependencies among the entities, the computer system 1000 generates a sequence of stages for removing, adding and upgrading the first, second and third sets of the entities, such that the entities are removed, added and upgraded according to a temporal order defined by the sequence of stages (block 930). To generate the sequence of stages, the computer system 1000 first generates a stage and assigns one or more not-yet-assigned entities in the first, second and third sets to the stage (block 931), and then the computer system 1000 repeats the generating and assigning until each of the entities in the first, second and third sets is assigned to one of the stages in the sequence (block 932).

Figure 10:
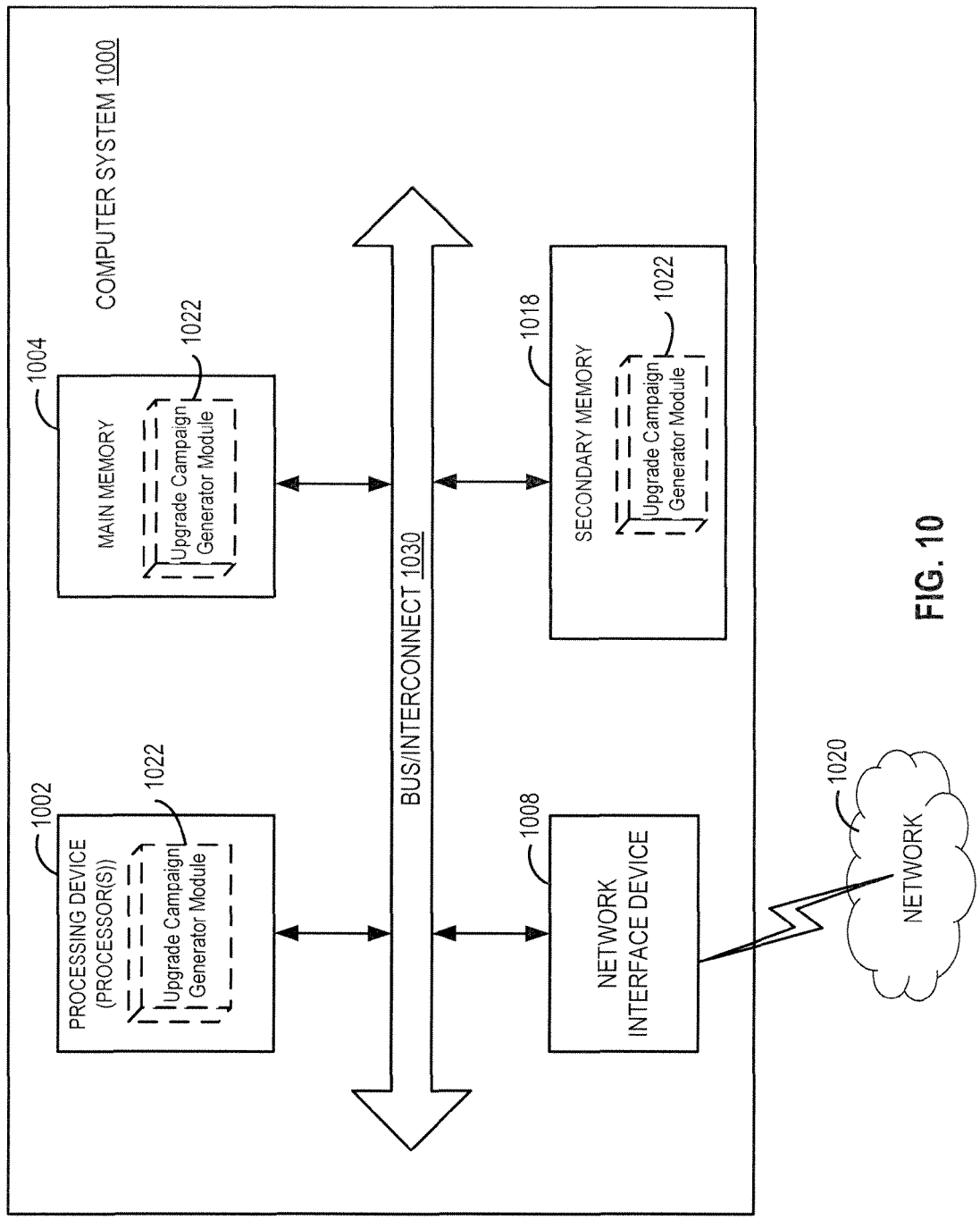
FIG. 10 illustrates an exemplary computer system according to one embodiment of the invention.

FIG. 10 illustrates a diagrammatic representation of a machine in the exemplary form of a computer system 1000 within which a set of instructions, for causing the machine to perform any one or more of the methodologies discussed herein, may be executed. The computer system 1000 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 1000 includes a processing device 1002. The processing device 1002 represents one or more general-purpose processors, each of which can be: a microprocessor, a central processing unit (CPU), a multicore system, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. In one embodiment, the processing device 1002 is adapted to execute the operations of a upgrade campaign generator module 1022, which may be the upgrade campaign generator 120 as described above in connection with FIG. 1.

In one embodiment, the processor device 1002 is coupled to one or more memory devices such as: a main memory 1004 (e.g., read-only memory (ROM), flash memory, dynamic random access memory (DRAM) such as synchronous DRAM (SDRAM) or Rambus DRAM (RDRAM), etc.), a secondary memory 1018 (e.g., a magnetic data storage device, an optical magnetic data storage device, etc.), and other forms of computer-readable media, which communicate with each other via a bus or interconnect 1030. The memory devices may also different forms of read-only memories (ROMs), different forms of random access memories (RAMs), static random access memory (SRAM), or any type of media suitable for storing electronic instructions. In one embodiment, the memory devices may store the code and data of the upgrade campaign generator 120 described above in connection with FIG. 1. In the embodiment of FIG. 10, the upgrade campaign generator module 1022 may be located in one or more of the locations shown as dotted boxes and labeled by the reference numeral 1022.

The computer system 1000 may further include a network interface device 1008. A part or all of the data and code of the upgrade campaign generator module 1022 may be transmitted or received over a network 1020 via the network interface device 1008. Although not shown in FIG. 10, the computer system 1000 also may include user input/output devices (e.g., a keyboard, a touchscreen, speakers, and/or a display).

In one embodiment, the upgrade campaign generator module 1022 can be implemented using code and data stored and executed on one or more computer systems (e.g., the computer system 1000). Such computer systems store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices as shown in FIG. 10 as 1004 and 1018) and transitory computer-readable transmission media (e.g., electrical, optical, acoustical or other form of propagated signals—such as carrier waves, infrared signals). A non-transitory computer-readable medium of a given computer system typically stores instructions for execution on one or more processors of that computer system. One or more parts of an embodiment of the invention may be implemented using different combinations of software, firmware, and/or hardware.

The operations of the methods of FIGS. 2-9 have been described with reference to the exemplary embodiment of FIG. 10. However, it should be understood that the operations of the methods of FIGS. 2-9 can be performed by embodiments of the invention other than those discussed with reference to FIG. 10, and the embodiment discussed with reference to FIG. 10 can perform operations different from those discussed with reference to the methods of FIGS. 2-9. While the methods of FIGS. 2-9 show a particular order of operations performed by certain embodiments of the invention, it should be understood that such order is exemplary (e.g., alter-

What is claimed is:

1. A method performed by a computer system for generating an upgrade campaign for software deployment configuration, the method comprising the steps of:
receiving, by the computer system, a source configuration and a target configuration for a software subsystem, wherein each of the source configuration and the target configuration contains entities and associated entity types;
generating a delta by comparing the source configuration and the target configuration to identify differences, the delta including a first set, a second set and a third set of the entities to be removed, added and upgraded, respectively, in the software subsystem; and
generating, based on dependencies among the entities, a sequence of stages including at least one stage for removing, at least one stage for adding and at least one stage for upgrading the first, second and third sets of the entities of the delta, such that the entities are grouped into the sequence of stages to be removed, added and upgraded according to a temporal order defined by the sequence of stages, wherein the step of generating further comprises: generating a stage and assigning one or more not-yet-assigned entities in the first, second and third sets of the entities from the delta to the stage; and
repeating the generating the stage and assigning of the entities until each of the entities in the first, second and third sets of the entities from the delta is assigned to one of the stages in the sequence, wherein the dependencies further comprise one or more selected from a group consisting of: the dependencies between components in a same protection group, between service instances, between component service instances of a service instance, between co-located components, and between service units of a service group.

2. The method of claim 1, wherein the first set contains the entities and their associated entity types to be removed from the source configuration, the second set contains the entities and their associated entity types to be added to the target configuration, and the third set contains the entities having changed entity types or changed configurations between the source configuration and the target configuration.

3. The method of claim 1, wherein the dependencies comprise the dependencies between a container entity and a contained entity.

4. The method of claim 1, wherein the dependencies comprise the dependencies between a proxy entity and a proxied entity.

5. The method of claim 1, wherein the dependencies comprise the dependencies between a service provider and a service, and between the service and sponsoring services of that service.

6. The method of claim 1, wherein the dependencies comprise service protection dependency, wherein service units belonging to a service group are added one or more stages earlier than being upgraded, or upgraded one or more stages earlier than being removed.

7. The method of claim 1, wherein, when removal of a service provider is postponed to a later stage, the method further comprises the steps of:
postponing removal of a service provided by the service provider; and
postponing removal of all sponsoring services of that service and respective service providers of the sponsoring services.

8. The method of claim 1, wherein, when addition of a service provider is postponed to a later stage, the method further comprises the steps of:
postponing addition of a service provided by the service provider; and
postponing addition of all dependent services of that service.

9. The method of claim 1, wherein operations on the entities belonging to a same stage are performed following an order of removing, upgrading and then adding.

10. A computer system adapted to generate an upgrade campaign for software deployment configuration, the computer system comprising: one or more processors; one or more memory devices coupled to the one or more processors; and an upgrade campaign generator coupled to the one or more processors and the one or more memory devices, the upgrade campaign generator adapted to:
receive a source configuration and a target configuration for a software subsystem, wherein each of the source configuration and the target configuration contains entities and associated entity types;
generating a delta by comparing the source configuration and the target configuration to identify the differences, the delta including a first set, a second set and a third set of the entities to be removed, added and upgraded, respectively, in the software subsystem; and
generate, based on dependencies among the entities, a sequence of stages including at least one stage for removing, at least one stage for adding and at least one stage for upgrading the first, second and third sets of the entities of the delta, such that the entities are grouped into the sequence of stages to be removed, added and upgraded according to a temporal order defined by the sequence of stages, wherein the step of generating further comprises:
generate a stage and assign one or more not-yet-assigned entities in the first, second and third sets of the entities from the delta to the stage; and
repeat the generating the stage and assigning of the entities until each of the entities in the first, second and third sets of the entities from the delta is assigned to one of the stages in the sequence, wherein the dependencies further comprise one or more selected from a group consisting of: the dependencies between components in a same protection group, between service instances, between component service instances of a service instance, between co-located components, and between service units of a service group.

11. The computer system of claim 10, wherein the first set contains the entities and their associated entity types to be removed from the source configuration, the second set contains the entities and their associated entity types to be added to the target configuration, and the third set contains the entities having changed entity types or changed configurations between the source configuration and the target configuration.

12. The computer system of claim 10, wherein the dependencies comprise the dependencies between a container entity and a contained entity.

13. The computer system of claim 10, wherein the dependencies comprise the dependencies between a proxy entity and a proxied entity.

14. The computer system of claim 10, wherein the dependencies comprise the dependencies between a service provider and a service, and between the service and sponsoring services of that service.

15. The computer system of claim 10, wherein the dependencies comprise service protection dependency, wherein service units belonging to a service group are added one or more stages earlier than being upgraded, or upgraded one or more stages earlier than being removed.

16. The computer system of claim 10, wherein, when removal of a service provider is postponed to a later stage, the upgrade campaign generator is further adapted to:
    postpone removal of a service provided by the service provider; and
    postpone removal of all sponsoring services of that service and respective service providers of the sponsoring services.

17. The computer system of claim 10, wherein, when addition of a service provider is postponed to a later stage, the upgrade campaign generator is further adapted to:
    postpone addition of a service provided by the service provider; and
    postpone addition of all dependent services of that service.

18. The computer system of claim 10, wherein operations on the entities belonging to a same stage are performed following an order of removing, upgrading and then adding.

* * * * *